Oct. 4, 1932.   R. S. TAYLOR   1,880,525
ABSORBER FOR REFRIGERATORS
Filed May 7, 1930
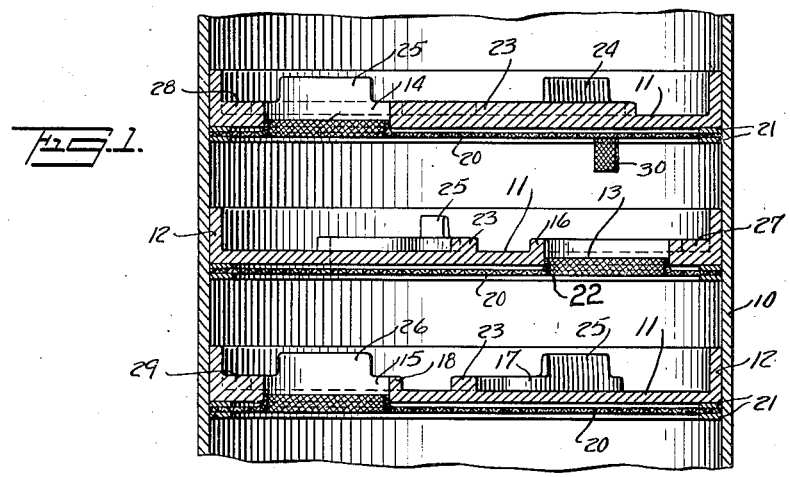
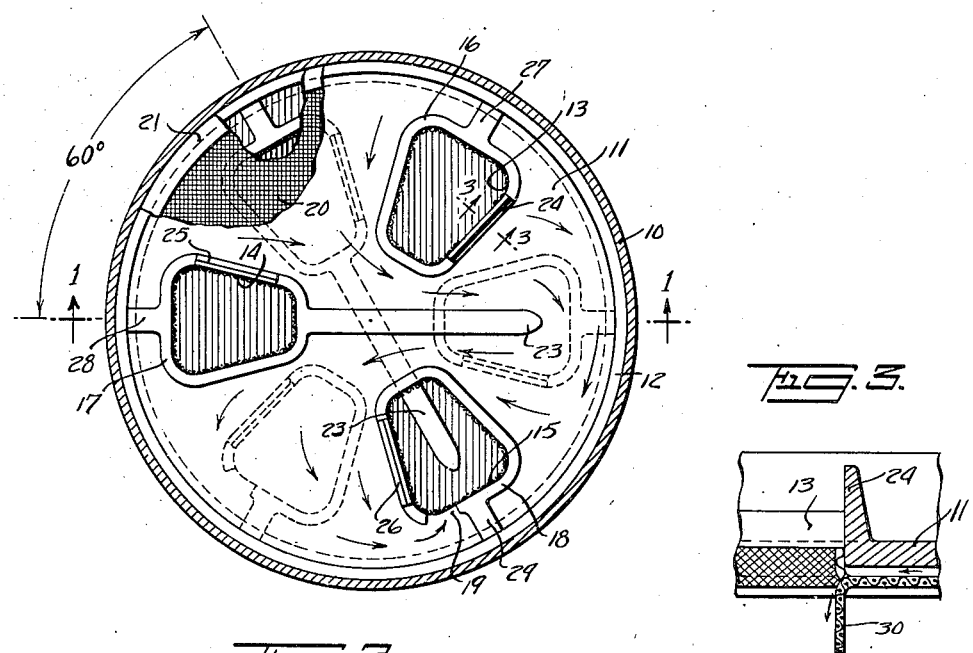
INVENTOR
Robert S. Taylor
BY
ATTORNEY Patented Oct. 4, 1932

1,880,525

UNITED STATES PATENT OFFICE

ROBERT S. TAYLOR, OF NEW YORK, N. Y., ASSIGNOR TO ELECTROLUX SERVEL CORPORATION, OF NEW YORK, N. Y., A CORPORATION OF DELAWARE

ABSORBER FOR REFRIGERATORS

Application filed May 7, 1930. Serial No. 450,415.

This invention relates to an improvement in the art of refrigeration and more particularly to an absorber or evaporator for use in a refrigerator of the absorption type wherein a cooling agent diffuses into an auxiliary agent and is subsequently separated from the auxiliary agent by absorption into a liquid.

The invention particularly relates to the specific part of the apparatus wherein the absorption into a liquid is accomplished and in which device plates or disks are employed for providing the absorbing surface and directing the circulation of the fluid and gas so as to bring them into contact.

It is an object of the invention to increase the efficiency of the absorber by increasing the amount of absorbing surface of each disk in the absorber and directing the circulation of the gas through the disks as well as the circulation of the fluid on the upper and lower surfaces of the disks.

In said drawing:

Fig. 1 is a fragmentary section taken on the line 1—1 of Fig. 2 of an absorber or evaporator illustrating one application of the invention;

Fig. 2 is a horizontal section through the absorber showing a top plan view of one of the disks; and Fig. 3 is a section on the line 3—3 of Fig. 2.

Referring to said drawing in which the same reference numerals are used to denote corresponding parts through the several views, 10 indicates the shell of an absorber or evaporator of general cylindrical formation and of ordinary steel construction. In the outer shell 10 are mounted a series of partitions in the form of plates or disks 11 having upturned flanges 12 at their outer edges disposed at right angles to the bodies of the disks and lying parallel to the evaporator shell and in snug heat conducting contact therewith.

In order to secure a snug or tight fit between the peripheral flanges of the disks and the shell, they are preferably shrunk together by heating the shell, placing the disks in their proper positions within the shell and subsequently cooling the shell to effect the desired contact.

Each disk is provided with three wedge-shaped openings or apertures 13, 14 and 15 for the passage of gas therethrough, the edges of the openings being struck up or elevated to provide marginal rims or flanges 16, 17 and 18 which are adapted to prevent liquid from passing directly through the openings. Such rims or retaining walls serve to cause the liquid refrigerant to spread over the upper surface of the disk in a relatively thin layer or film determined of course according to the height of the rims and after the liquid refrigerant has accumulated to such an extent that it spreads over the entire upper surface of the disk it will then flow over the rims if the deposit upon the disk is too rapid, but if such deposit is gradual will flow through a discharge passage 19 onto a screen 20 on the under side of the disk. The screen 20 corresponds in size to the under surface of the disk and has its periphery clamped between a pair of rings 21, the upper of which is of a thickness to maintain the screen spaced slightly away from the under surface of the disk. The screen is preferably formed of reticulated wire of a fine mesh and is provided with openings in the disk with struck up portions 22 extending partially through the openings 13, 14 and 15 in the disk but not materially obstructing said openings. Such struck up portions prevent liquid leak at these points. At one side of the opening 13 the screen is provided with a depending lip or flange 30 to define the place where liquid will drop from the screen onto the next lower disk when assembled in the absorber. The flange or rim 17 at its edge nearest the center of the disk is provided with an extension or rib 23 which extends nearly to the opposite side of the disk between the openings 13 and 15 requiring any liquid that passes through the discharge opening 19 when deposited on the disk between the openings 13 and 14 to travel in a circuitous path around the free end of the rib 23 to reach the discharge opening at the opposite side of the disk.

The raised rims 16, 17 and 18 are provided with short radial extensions 27, 28 and 29 respectively which also obstruct the flow of liquid. Liquid which passes through the discharge opening will be diffused over the bottom of the disk and on the wire mesh until a sufficient quantity is retained due to surface and capillary attraction and the entire upper and lower surface of the disk carries a film of liquid. This results in a materially larger capacity of the machine per unit weight.

The disks are preferably assembled within the absorber so that their openings are staggered or out of alinement in order to locate the depending flow directing flange of the screen over an imperforate surface of the next lower disk. As illustrated in Fig. 2, the disks are arranged staggered substantially 60° and the liquid will be deposited on the side of the rib 22 opposite the discharge passage. In order to direct the flow of the gas passing up through the absorber in a more or less spiral path, the ribs or flanges 16, 17 and 18 are provided at one side with extensions 24, 25 and 26 which extensions serve as baffles, thereby causing the flow of the gas to be away from said baffles. If the improved disk is used in the evaporator where the surface considerations are less important, these directing flaps or extensions may be omitted, as of course they may be omitted in the absorber and therefore the invention is not limited to the use of the device merely in an absorber or evaporator, but contemplates their use in any capacity where it is desired to insure a thorough commingling of a liquid and a gas, the invention merely being illustrative.

I claim:

1. In a refrigerator, an absorber comprising an outer shell, a plurality of spaced plates within said absorber for producing contact between gas and liquid, said plates having apertures therein, an obstruction about each of said apertures, an obstruction disposed between a pair of the apertures for causing liquid deposited on one side of the obstruction to travel in a tortuous path to the other side, and an extension at the side of one of the apertures for directing the flow of gas passing through the plate.

2. In a refrigerator, an absorber comprising an outer shell, a plurality of spaced plates within said absorber for effecting contact between a gas and a liquid, said plates having apertures therein, an obstruction about each of said apertures, an obstruction disposed between a pair of the apertures for causing liquid deposited on one side of the obstruction to travel in a tortuous path to reach the other side, and upstanding flaps on corresponding sides of the apertures for directing the flow of gas spirally through the absorber.

3. In a refrigerator, an absorber comprising an outer shell, a plurality of spaced plates within said absorber for effecting contact between a gas and a liquid, said plates having apertures therein, an obstruction about each of said apertures, an obstruction disposed between a pair of the apertures for causing liquid deposited on one side of the obstruction to travel in a tortuous path to reach the other side, upstanding flaps on corresponding sides of the apertures, and a screen secured in spaced relation to the underside of the plate.

4. In a refrigerator, an absorber comprising an outer shell, a plurality of spaced plates within said absorber for effecting contact between a gas and a liquid, said plates having apertures therein, an obstruction about each of said apertures, an obstruction disposed between a pair of the apertures for causing liquid deposited on one side of the obstruction to travel in a tortuous path to reach the other side, upstanding flaps on corresponding sides of the apertures, a screen secured in spaced relation to the underside of the plate, and having apertures with upturned rims projecting into the apertures of the plate.

5. An absorber disk comprising a perforated plate having an upturned peripheral flange, raised rims surrounding the apertures in the plate, a rib extending from one of said raised rims in proximity to the opposed flange and between apertures of the plate, and an obstruction extending from the rim of each aperture to the peripheral flange of the plate.

6. An absorber disk comprising a perforated plate having an upturned peripheral flange, raised rims surrounding the apertures in the plate, a rib extending from one of said raised rims in proximity to the opposed flange and between apertures of the plate, an obstruction extending from the rim of each aperture to the peripheral flange of the plate, and a screen on the underside of said plate.

7. A device of the class described comprising a plate provided with spaced perforations and raised rims about said perforations, one of said raised rims being cut away to form a discharge passage, and means for directing the discharge of liquid from the under surface of the plate from beneath another raised rim.

8. An absorber disk comprising a perforated plate having an upstanding peripheral flange, means for defining a circuitous path for liquid across said plate, and a flange extending upwardly from the side of a perforation in the plate for directing the flow of gas through said perforation.

9. An absorber disk comprising a circular plate having an upturned peripheral flange, three apertures 120° apart and equidistant from the center of said plate, raised rims surrounding said apertures, a rib extending from the rim of one of said apertures between the other two apertures approximately to the peripheral flange of the plate, and a rib extending from the rim of each aperture to the peripheral flange of the plate.

10. An absorber baffle comprising a plate having a plurality of apertures, raised rims around said apertures, a raised rib extending from the rim of one aperture between the other apertures approximately to the outer edge of said plate, and a raised rib extending from the rim of each of said apertures to the outer edge of said plate.

11. An absorber disk comprising a circular plate having an upturned peripheral flange, three apertures in said plate 120° apart and equidistant from the center of said plate, raised rims around said apertures, baffles substantially perpendicular to said plate and extending from corresponding portions of said rims, a raised rib extending from the rim around one of said apertures between the other two apertures approximately to the peripheral flange of the plate, and a raised rib extending from each of said rims to said peripheral flange.

12. An absorber baffle comprising a plate having a plurality of apertures, raised rims around said apertures, baffle plates extending upwardly from corresponding portions of said rims, a raised rib extending from the rim of one aperture between the other apertures aproximately to the edge of said plate, and a raised rib extending from each of said rims to the edge of said plate.

13. In a gas and liquid contact apparatus means for causing both the gas and liquid to flow in a circuitous path through the apparatus, said means comprising a plurality of ribbed perforated partition members arranged with the perforations disposed in offset relation, and baffle means associated with certain of said perforations in a manner to cause the gas to take a circuitous path, said ribs being also designed to direct the flow of liquid in a circuitous path across the partition members.

In testimony whereof I affix my signature.
ROBERT S. TAYLOR.